(12) United States Patent
Witchey

(10) Patent No.: US 6,173,590 B1
(45) Date of Patent: Jan. 16, 2001

(54) SKID STEER LOCK

(76) Inventor: Bryan Witchey, 209 Fairway Cir., Cross Junction, VA (US) 22625

( * ) Notice: Under 35 U.S.C. 154(b), the term of this patent shall be extended for 0 days.

(21) Appl. No.: 09/492,298

(22) Filed: Jan. 27, 2000

Related U.S. Application Data

(60) Provisional application No. 60/117,838, filed on Jan. 29, 1999.

(51) Int. Cl.[7] .................................................. B60R 25/00
(52) U.S. Cl. ................................. 70/14; 70/199; 70/202; 70/209; 70/211; 70/238
(58) Field of Search ..................... 70/14, 19, 94, 70/174, 198–203, 209, 226, 211, 212, 237–239, 247, 254

(56) References Cited

U.S. PATENT DOCUMENTS

| | | | |
|---|---|---|---|
| 558,467 | * 4/1896 | Adams | 70/226 |
| 2,596,802 | * 5/1952 | Will | 70/200 |
| 3,729,963 | * 5/1973 | Hintz | 70/230 |
| 4,103,524 | 8/1978 | Mitchell et al. | 70/209 |
| 4,432,432 | * 2/1984 | Martin | 70/238 X |
| 4,887,443 | 12/1989 | Wang | 70/209 |
| 4,970,884 | 11/1990 | Solow | 70/209 |
| 5,022,697 | * 6/1991 | Hettwer | 70/238 X |
| 5,082,213 | * 1/1992 | Torres | 70/200 X |
| 5,121,617 | * 6/1992 | Chen | 70/226 X |
| 5,142,889 | * 9/1992 | Liu | 70/226 X |
| 5,144,822 | * 9/1992 | Jan et al. | 70/226 X |
| 5,345,796 | * 9/1994 | Chieh et al. | 70/202 |
| 5,440,907 | 8/1995 | Shen | 70/209 |
| 5,557,956 | 9/1996 | Merz | 70/209 |
| 5,582,045 | 12/1996 | Ahmed | 70/209 |
| 5,639,001 | * 6/1997 | Brady | 70/226 X |
| 5,713,229 | 2/1998 | Garcia et al. | 70/209 |
| 5,765,415 | 6/1998 | Savinsky | 70/209 |
| 5,865,044 | 2/1999 | Wu | 70/209 |
| 5,887,464 | * 3/1999 | Perez | 70/226 X |
| 5,908,178 | * 6/1999 | Saudhagen | 70/58 X |
| 5,911,391 | * 6/1999 | Russ et al. | 70/198 X |
| 5,927,108 | * 7/1999 | Pierce | 70/226 X |
| 5,953,941 | * 9/1999 | Freund | 70/199 |
| 6,003,350 | * 12/1999 | Sentner, Jr. | 70/202 |
| 6,112,560 | * 9/2000 | Mabee | 70/14 |
| 6,116,065 | * 9/2000 | Hale | 70/200 |

FOREIGN PATENT DOCUMENTS

| | | | |
|---|---|---|---|
| 506328 | * 8/1920 | (FR) | 70/226 |
| 1127524 | 9/1968 | (GB) . | |
| 2039840 | 8/1980 | (GB) . | |
| WO 97/34788 | 9/1997 | (WO) . | |

* cited by examiner

*Primary Examiner*—Lloyd A. Gall
(74) *Attorney, Agent, or Firm*—Richard C. Litman

(57) ABSTRACT

A skid steer locking device for immobilizing the steering, bucket and boom controls of a skid steer loader of a Bobcat-type vehicle with a grid cage. The locking device comprises a main shaft body having a keyed or combination lock and a telescopic shaft body, wherein each shaft end has a pair of fingers with offset stopper flanges for engaging the opposite sides of a grid cage. An adapter element attached to the device at the base of the fingers also locks certain bucket and boom controls. The device can be locked in a collapsed position. Clips on the shafts enable hanging the collapsed device inside the cab during operation of the vehicle.

4 Claims, 3 Drawing Sheets

SKID STEER LOCK

CROSS-REFERENCE TO RELATED APPLICATION

This application claims the benefit of U.S. Provisional Patent Application Serial No. 60/117,838, filed Jan. 29, 1999.

BACKGROUND OF THE INVENTION

1. FIELD OF THE INVENTION

The present invention relates generally to anti-theft devices for vehicles. More specifically, the invention is an anti-theft device for a skid steer loader to prevent unauthorized control of the steering, the bucket, the boom, and hinders access to the control seat.

2. DESCRIPTION OF THE RELATED ART

The related art of interest describes various steering wheel locking devices, but none discloses the present invention. There is a need for a combination locking device for the steering controls, bucket control, and the boom control for a skid steel loader which also connects the locking device to both sides of the grid cage of the skid steer loader. The relevant art will be discussed in the order of perceived relevance to the present invention.

U.S. Pat. No. 5,865,044 issued on Feb. 2, 1999, to Jin Fu Wu describes a steering wheel lock comprising a tubular member having a handle grip at one end to block rotation of the steering wheel, and a wheel rim hook and a keyed lock on the opposite end. A solid rod with another wheel rim hook telescopes into the lock portion with a ratchet toothed end to permit only axial extension when locked and only axial contraction only when unlocked. The wheel lock is distinguishable for its singular function of locking only the steering wheel.

The following patents describe similar steering wheel locks: U.S. Pat. No. 4,887,443 issued on Dec. 19, 1989, to Ching Rong Wang; U.S. Pat. No. 5,440,907 issued on Aug. 15, 1995, to Chao C. Shen; and U.S. Pat. No. 5,557,956 issued on Sep. 24, 1996, to Carl F. Merz.

The following patents describe steering wheel locks wherein the end rim hook with a lock slides along a single rod having a rim hook. U.S. Pat. No. 4,970,884 issued on Nov. 20, 1990, to Joseph E. Solow describes the carriage member having apertures to accept a ball in the lock under spring compression. U.S. Pat. No. 4,103,524 issued on Aug. 1, 1978, to Ronald A. Mitchell et al. describes a locking slide mechanism having a saddle and a depending loop to secure the steering wheel rim against a hook.

The following patents describe a parallel rod structure to secure a steering wheel. U.S. Pat. No. 5,713,229 issued on Feb. 3, 1998, to Adolfo Garcia et al. describes two parallel rods joined in a midsection with each rod having the usual structure with rim hooks and handle at one end and telescoping rods having circumferential recesses and forks. U.S. Pat. No. 5,765,415 issued on Jun. 16, 1998, to Stanislav Savinsky describes a hook-shaped structure to secure the rim at one end and a keyed lock at the opposite end of a pivoting handle having a plate with two hooks to secure the rim. These patents are distinguishable for devices having a doubled rod structure.

U.S. Pat. No. 5,582,045 issued on Dec. 10, 1996, to Sayeed Ahmed describes a steering wheel lock device having two pivoting parts wherein one part has a fork and a lock and the other part has a movable member which encircles the steering wheel rim. The device is distinguishable for its pivoting structure and limitation to a steering wheel.

Gt. Britain Patent Application No. 1,127,524 published on Sep. 18, 1968, for Henry Clarke et al. describes a steering wheel locking device formed from a stationary channel beam having a sliding apertured bar with a pair of lugs held at the internal end by a spring. A keyed lock on the stationary channel beam with a bolt penetrates one of the series of holes to lock the bar. The device is distinguishable for its channel beam and spring construction.

U.K. Patent Application No. 2,039,840 published on Aug. 20, 1980, for Allen S. L. Owensmith describes three embodiments of a steering wheel locking device. The first embodiment comprises an apertured metal tube with a rectangular cross-section along which a sleeve with an aligning aperture having a hook or a doubled hook slides to engage a wheel rim. A hook or a doubled hook is fixed at one end of the tube. A padlock locks the sleeve's position. A second embodiment utilizes two sleeves having hooks with one sleeve fixed. A third embodiment has one apertured hooked tube sliding within another apertured hooked tube. The devices are distinguishable for their padlocking requirements.

PCT Application No. WO 97/34788 published on Sep. 25, 1997, for Andrew Jackson describes a motor vehicle anti-theft device for locking a steering wheel comprising an S-shaped immobilizer bar which positions underneath a steering wheel rim, and a fixed lock at an opposite end having a pair of pivoting hooks to lock the opposite steering wheel rim. The device is distinguishable for its rotating hooks on the lock.

An Internet publication was seen describing a skid lock which locks the boom arms and the bucket in the full up position outside the cage, and does not include the locking fingers and the adapter element of the present invention. The publication was sent by E TIP, Inc., P.O. Box 571, Addison, Ill. 60101.

None of the above inventions and patents, taken either singularly or in combination, is seen to describe the instant invention as claimed. Thus, a skid steer lock solving the aforementioned problems is desired.

SUMMARY OF THE INVENTION

The present invention is a locking device for immobilizing the steering, bucket and boom controls inside a skid steer loader such as a Bobcat-type vehicle with a grid-type cage. A main shaft body with a key or combination lock has a telescopic shaft body with apertures for locking the device. Each shaft body has a pair of distal fingers for engaging the grid cage and immobilizing the vehicle controls. An adapter element is added for locking various hand control rods.

Accordingly, it is a principal object of the invention to provide a combination skid steer lock for a vehicle having a driver's grid cage.

It is another object of the invention to provide a combination skid steer lock which attaches at each end to the driver's cage.

It is a further object of the invention to provide a combination skid steer lock which immobilizes the steering controls.

Still another object of the invention is to provide a combination skid steer lock which prevents access to the bucket and boom controls.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is directed to a combination locking device for immobilizing the steering, bucket and boom controls in the caged cab of a skid steer loader vehicle.

Figure 1:
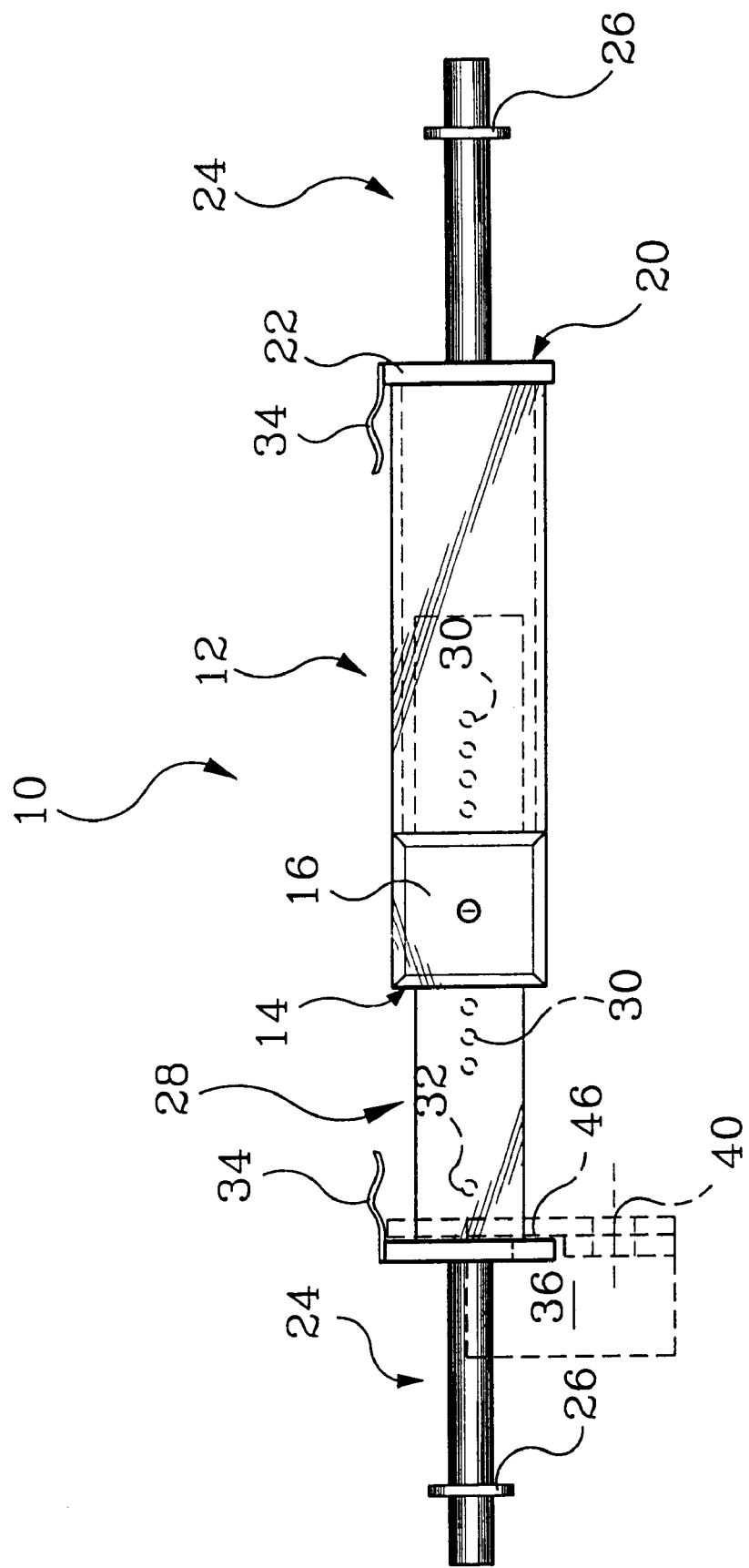
FIG. 1 is a top plan view of a skid steer lock with an adapter in shadow according to the present invention.
Figure 2:
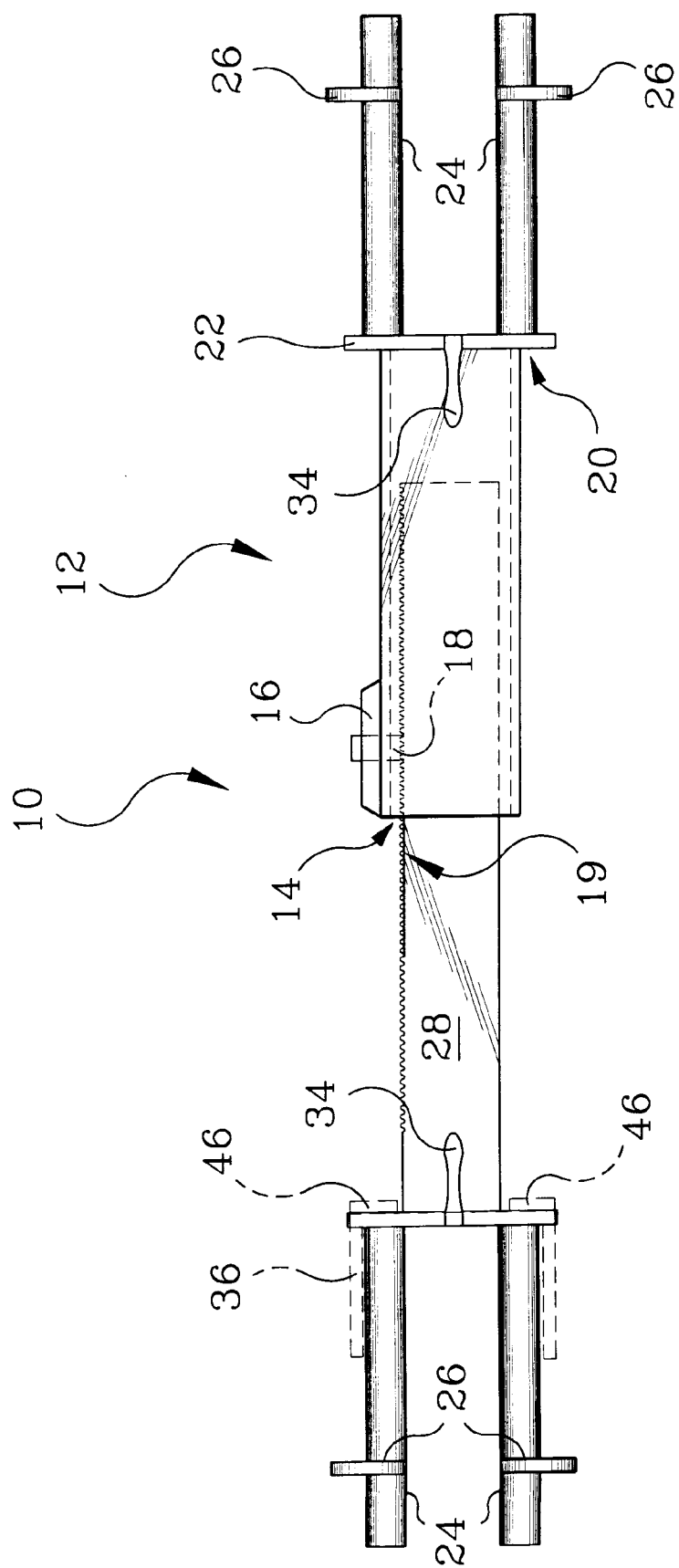
FIG. 2 is a side elevational view of the skid steer lock with the adapter in shadow according to the present invention.

Referring to FIGS. 1 and 2, a combination locking device 10 has a main shaft body 12 consisting of a steel shaft with a square cross-section and a first end 14 with a keyed or combination lock 16 having a locking pin 18 for apertures 30 or ridges 19 shown in FIG. 2. The opposite or second end 20 of the main shaft body 12 has a rectangular finger base plate 22 which supports a pair of cylindrical fingers 24 having circular stopper flanges 26 offset on each finger 24 to extend to the outside as seen in FIG. 2. The offset configuration of the flanges 26 on the fingers 24 permits entry of the operating handles between the fingers. The fingers 24 or flanges 26 can alternatively have a square cross-section.

A telescopic apertured steel shaft body 28 having a series of aligned apertures 30 along its side (FIG. 1) is configured to be in alignment with the locking pin 18 of the lock 16, and has a square cross-section which frictionally slides within the main shaft 12. As seen on the opposite end, a finger base plate 22, and flanged fingers 24 are attached.

The main shaft body 12 and the telescopic shaft body 28 are inserted from inside the gridded cage made from a stamped metal sheet to engage the grid of the cab with the finger stopper flanges 26 at each end pressing snugly against the metal stamped grid. The shaft bodies 12 and 28 are then locked with a key or a combination lock to insert the locking pin 18 into an aligned aperture 30 or ridges of the telescopic shaft body 28.

It should be noted that the fingers 24 can be either cylindrical as shown or have a square cross-section due to different cage grid opening configurations.

For storage purposes, a single aperture 32 is formed in the telescopic shaft body 28 adjacent to the finger base plate 22 for locking the device 10 in a collapsed condition during storage. Both finger base plates 22 can have a small metal clip 34 for hanging the collapsed device 10 on the inside of the cage when using the vehicle.

Figure 3B:
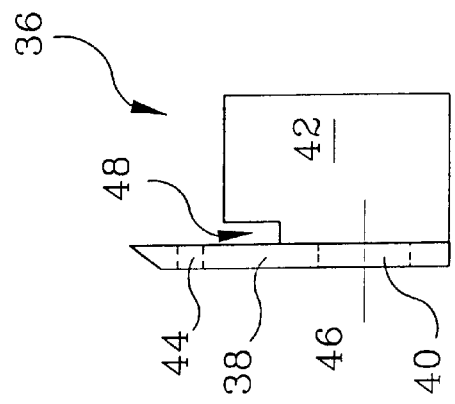
FIG. 3B side elevational view of the adapter.
Figure 3C:
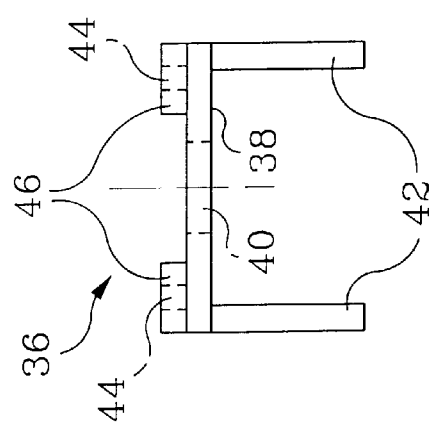
FIG. 3C is a front elevational view of the adapter.
Figure 3A:
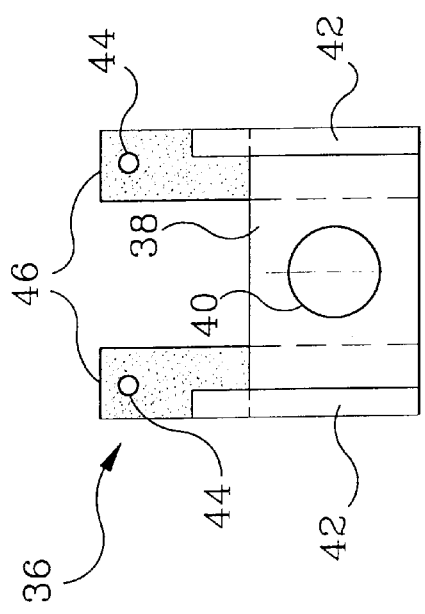
FIG. 3A is a top plan view of the adapter for preventing access to the controls of the boom and bucket.

Turning to FIGS. 3A, 3B and 3C, an important part of the invention is the adapter element 36 which provides the immobilization of the controls for the boom and the bucket. Since the location of the controls of different vehicles can vary from single controls on either side or both sides of the steering controls, one or two adapter elements 36 can be utilized. A rectangular panel 38 has a centered aperture 40 and two rectangular side guard panels 42 having equal widths but a shorter height to form a U-shaped structure. The panel 38 also has a throughbore 44 for securing the adapter element 36 to the finger base plate 22 with a non-reversible screw (not shown). The side guard panels 42 abut the outside surfaces of the fingers 24. Two upright rectangular studs or legs 46 ( optionally chamfered or beveled on top) project from the rectangular panel 38 to capture the finger base plate 22 in the pair of slots 48 and the planar sides of the shaft bodies 12 and/or 28.

The operating control handles in various vehicles can be positioned either vertical, horizontal or pivoting in a neutral position and on one or both sides. The adapter element 36 is utilized when the operating handle is either in a horizontal or pivoting position to insert the end of the handle into the aperture 40 in the panel 38 to immobilize the handle. For vertically positioned handles that pivot, a joint pin can be removed. The adapter's side guard panels 42 limit access to the handle for immobilization.

The stamped steel grid forming a 37 inch wide cage can have apertures varying from 1 to 2 inches in the form of squares, rectangles or parallelograms. The stamped grid can be 3/16 inch in thickness and cannot be shaken to dislodge the locking device 10.

Exemplary dimensions of the steel combination locking device 10 are as follows:

Total length of device 10, 40 in.

Main shaft body 12, 13 in. length, 2.5 in. O.D., 1.75 in. I.D. square.

Telescopic shaft body 28, 13 in. length, 1.75 in. O.D. square.

Apertures 30, 32, 8 apertures, 7/16 in. diameter.

Lock 16, 2.5 in. square.

Finger base plate 22, 4.5 in. length, 2.5 in. width, 5/16 in. thick.

Fingers 24 (cylindrical), 7.5 in. length, 1 3/16 in. diameter.

Offset flanges 26, 2.5 in. diameter, 5/16 in. thick.

Adapter (steel) 36 from 5/16 in. thick stock: Rectangular panel 38, 4 5/8 in. length, 2.75 in. height, aperture 40, 1.75 in. diameter; two rectangular side guard panels 42, 4 5/16 in. height, 2 5/16 in. width with slots 48, 1 9/16 in. deep and 7/16 in. wide; and studs or legs 46, 5.25 in. length, 1 in. width, chamfered on top.

The device 10 is designed to universally lock all of the different makes of skid steer vehicles presently made which permit steering by rotating the wheels on one side while the other side wheels remain stationary.

It is to be understood that the present invention is not limited to the embodiment described above, but encompasses any and all embodiments within the scope of the following claims.

I claim:

1. A skid steer lock device for immobilizing the steering and/or boom and bucket controls of a skid steer vehicle comprising:

a hollow main shaft body having a longitudinal axis, a first end, an opposite second end, and a square cross-section;

a key or combination lock having a locking pin positioned on the outside surface of the first end of the main shaft body;

a hollow telescopic shaft body having one end with a series of aligned apertures or ridges and a diameter adapted for insertion into the first end of the main shaft body; and a pair of cylindrical fingers having offset stopper flanges proximate its distal ends, said pair of fingers positioned at the opposite end of the telescopic shaft body and at the opposite end of the main shaft body on finger base plates;

whereby the fingers of each end of the device are adapted to extend through a grid of a cage up to the offset stopper flanges and locked to prevent access to the controls.

2. The skid steer lock device according to claim 1, wherein the telescopic shaft body has an aperture or a ridge proximate to the base plate for locking the device in a collapsed condition during storage.

3. The skid steer lock device according to claim 1, wherein a clip is positioned on each base plate for hanging the device on the cage during storage inside the cage of the vehicle.

4. The skid steer lock device according to claim 1, including an adapter element comprising an apertured rectangular base panel attached to two side guard panels on one surface to form a U-shape, and two apertured studs attached to the opposite surface of the base panel, whereby a pair of adapter elements can be attached to the base plates by non-reversible fasteners to further prevent access to the controls for the boom and bucket of the vehicle.

* * * * *